United States Patent
Trevino

(10) Patent No.: US 8,888,120 B2
(45) Date of Patent: *Nov. 18, 2014

(54) TOWING VEHICLE GUIDANCE FOR TRAILER HITCH CONNECTION

(75) Inventor: James S. Trevino, Manzanita, OR (US)

(73) Assignee: Target Hitch LLC, Arch Cape, OR (US)

( * ) Notice: Subject to any disclaimer, the term of this patent is extended or adjusted under 35 U.S.C. 154(b) by 1666 days.

This patent is subject to a terminal disclaimer.

(21) Appl. No.: 11/698,708

(22) Filed: Jan. 25, 2007

(65) Prior Publication Data

US 2008/0180526 A1 Jul. 31, 2008

(51) Int. Cl.
*B60D 1/36* (2006.01)
*H04N 7/18* (2006.01)

(52) U.S. Cl.
CPC .................. *B60D 1/36* (2013.01)
USPC .................. 280/477; 348/148

(58) Field of Classification Search
USPC .................. 348/148; 280/477
See application file for complete search history.

(56) References Cited

U.S. PATENT DOCUMENTS

| | | | |
|---|---|---|---|
| 4,552,376 A * | 11/1985 | Cofer | 280/477 |
| 5,452,982 A | 9/1995 | Engle | |
| 5,461,471 A | 10/1995 | Sommerfeld | |
| 5,513,870 A * | 5/1996 | Hickman | 280/477 |
| 5,650,764 A | 7/1997 | McCullough | |
| 5,729,194 A | 3/1998 | Spears et al. | |
| 5,951,035 A | 9/1999 | Phillips, Jr. et al. | |
| 6,100,795 A | 8/2000 | Otterbacher et al. | |
| 6,120,052 A | 9/2000 | Capik et al. | |
| 6,178,650 B1 | 1/2001 | Thibodeaux | |
| 6,222,457 B1 | 4/2001 | Mills et al. | |
| 6,252,497 B1 * | 6/2001 | Dupay et al. | 340/431 |
| 6,259,357 B1 | 7/2001 | Heider | |
| 6,386,572 B1 | 5/2002 | Cofer | |
| 6,581,695 B2 | 6/2003 | Bernhardt et al. | |
| 6,592,230 B2 | 7/2003 | Dupay | |
| 6,611,744 B1 | 8/2003 | Shimazaki et al. | |
| 6,663,132 B1 | 12/2003 | Kizy | |

(Continued)

FOREIGN PATENT DOCUMENTS

| | | | | |
|---|---|---|---|---|
| EP | 921056 A2 * | 6/1999 | | B62D 53/12 |
| EP | 1238577 A1 | 11/2002 | | |
| GB | 2277721 A | 9/1994 | | |

OTHER PUBLICATIONS

Trevino, European Examination Report for EP 08725631.0, Mar. 5, 2012, 4 pages.

(Continued)

*Primary Examiner* — Emmanuel L Moise
*Assistant Examiner* — Mahran Abu Roumi
(74) *Attorney, Agent, or Firm* — Chernoff, Vilhauer, McClung & Stenzel, LLP

(57) ABSTRACT

Apparatus and a method for its use to assist an operator of a towing vehicle in backing the towing vehicle accurately into a position in which parts of a hitch can be mated to connect the towing vehicle with a trailer. A camera in a towing vehicle module provides the towing vehicle operator a video image of the trailer and a target mounted on it. A beam of light from the towing vehicle module and falling on the target is visible in the video image to show when the towing vehicle approaches and reaches a position in which the hitch can be mated.

22 Claims, 12 Drawing Sheets

(56) References Cited

U.S. PATENT DOCUMENTS

| | | |
|---|---|---|
| 6,693,524 B1 | 2/2004 | Payne |
| 6,765,607 B2 | 7/2004 | Mizusawa et al. |
| 6,769,709 B1 | 8/2004 | Piper et al. |
| 6,827,363 B1 | 12/2004 | Amerson |
| 6,900,724 B2 | 5/2005 | Johnson |
| 6,970,184 B2 | 11/2005 | Hirama et al. |
| 6,977,584 B2 | 12/2005 | Milliken |
| 7,195,267 B1 * | 3/2007 | Thompson .................... 280/477 |
| 7,309,075 B2 | 12/2007 | Ramsey et al. |
| 7,396,035 B1 | 7/2008 | Smith |
| 2001/0043142 A1 | 11/2001 | Milliken |
| 2001/0045978 A1 | 11/2001 | McConnell et al. |
| 2002/0008616 A1 | 1/2002 | Bigelow, Jr. |
| 2002/0110262 A1 | 8/2002 | Iida et al. |
| 2002/0145663 A1 | 10/2002 | Mizusawa et al. |
| 2002/0149673 A1 * | 10/2002 | Hirama et al. ................ 348/118 |
| 2003/0234512 A1 * | 12/2003 | Holub .......................... 280/432 |
| 2004/0215374 A1 | 10/2004 | Shepard |
| 2004/0252019 A1 * | 12/2004 | Paull ............................ 340/431 |
| 2005/0062590 A1 | 3/2005 | Lang et al. |
| 2005/0074143 A1 | 4/2005 | Kawai |
| 2005/0104322 A1 | 5/2005 | Swannie |
| 2005/0193603 A1 | 9/2005 | Schultz et al. |
| 2006/0255560 A1 | 11/2006 | Dietz |
| 2006/0261574 A1 * | 11/2006 | Milner et al. ................ 280/477 |
| 2008/0231701 A1 | 9/2008 | Greenwood |
| 2010/0228236 A1 * | 9/2010 | Muhlhoff et al. ................ 606/4 |

OTHER PUBLICATIONS

Trevino, European Search Report and Written Opinion for EP 08725631.0, Jan. 27, 2011, 7 pages.

Trevino, International Search Report and Written Opinion, Aug. 6, 2009, PCT/US2008/000704, 7 pages.

Trevino, Int'l Search Report and Written Opinion, dated Jul. 27, 2012, for PCT/US2012/037738, 12 pages.

* cited by examiner

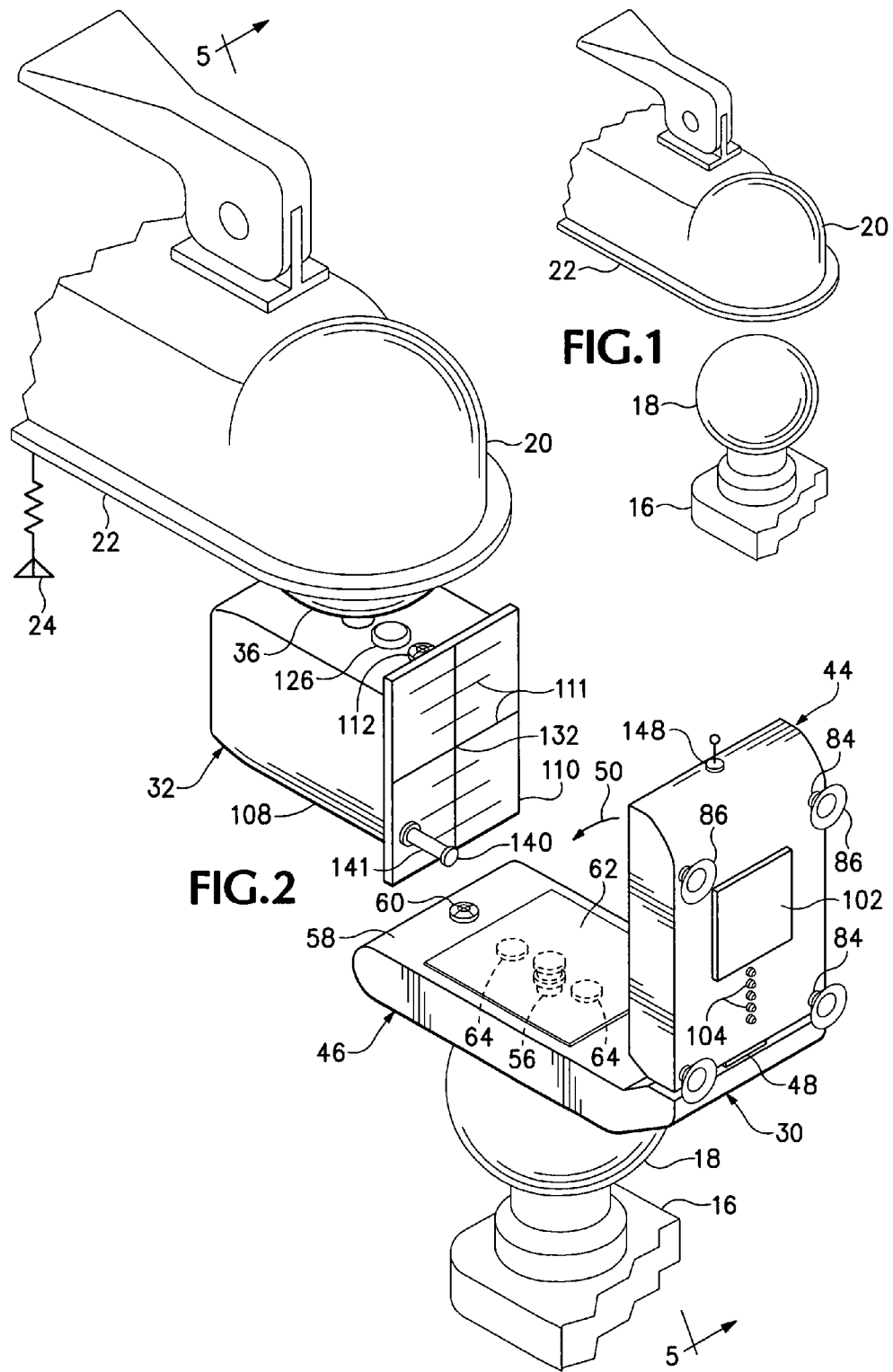

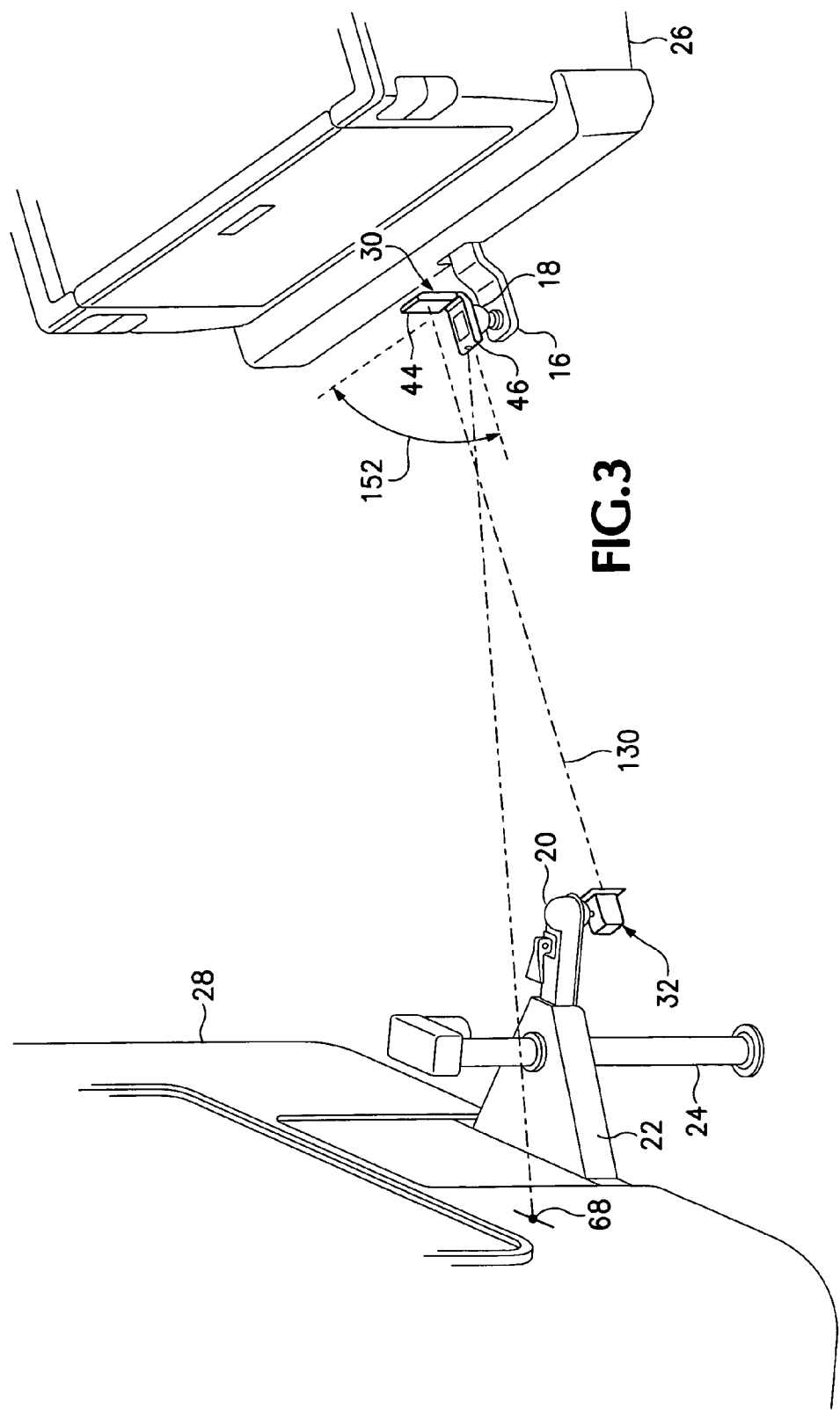

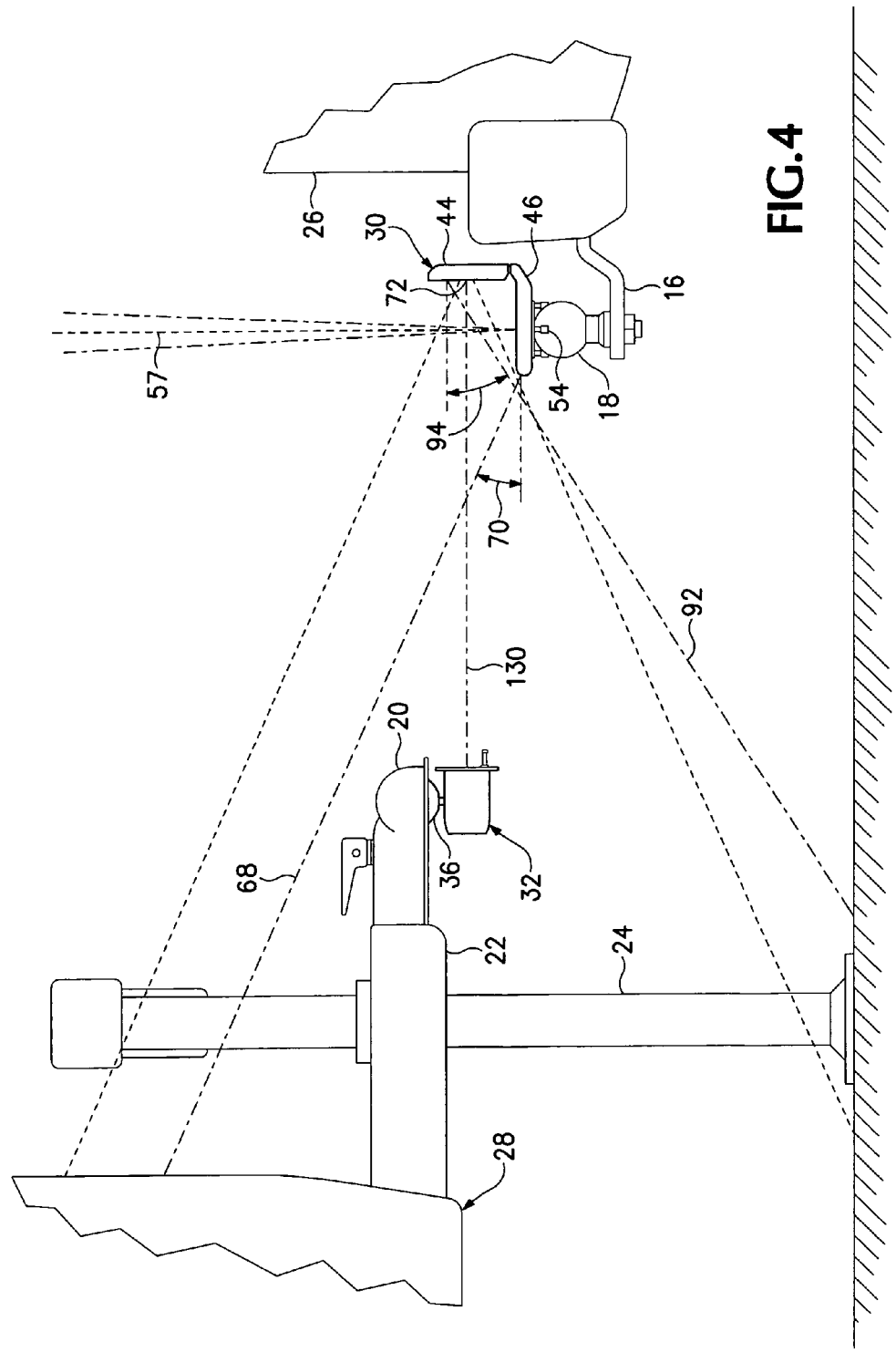

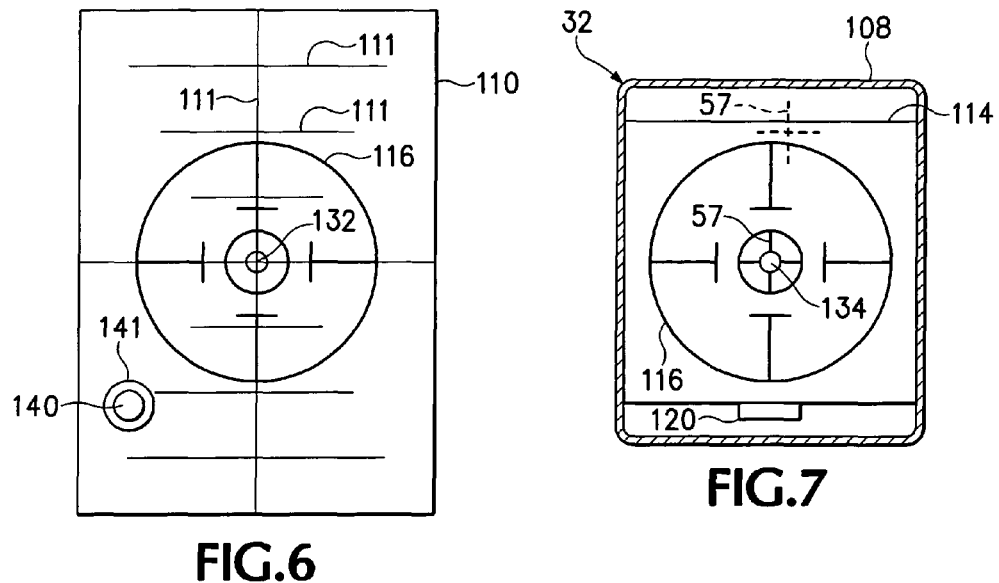
FIG.6   FIG.7
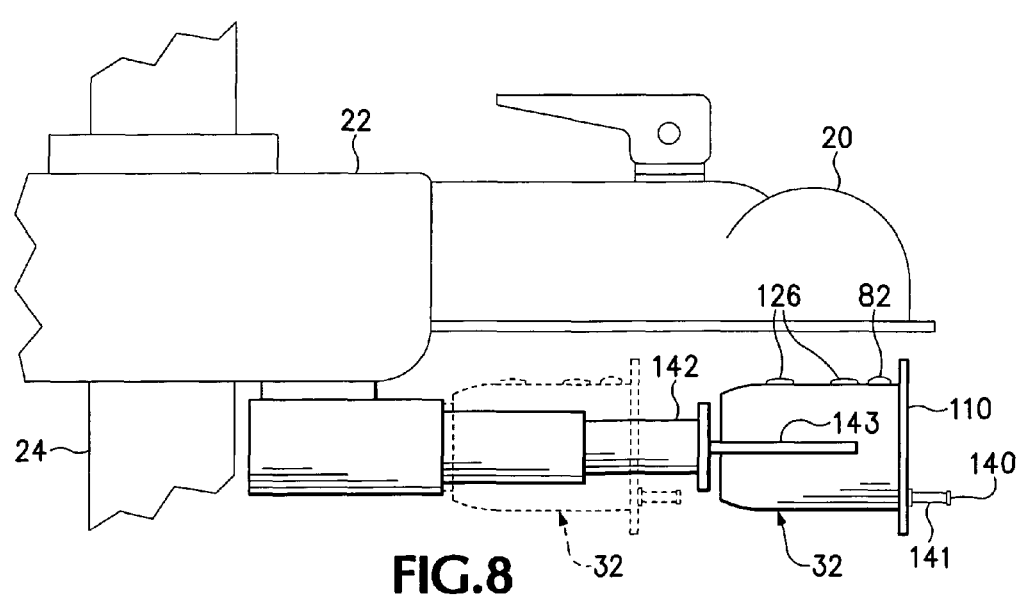
FIG.8

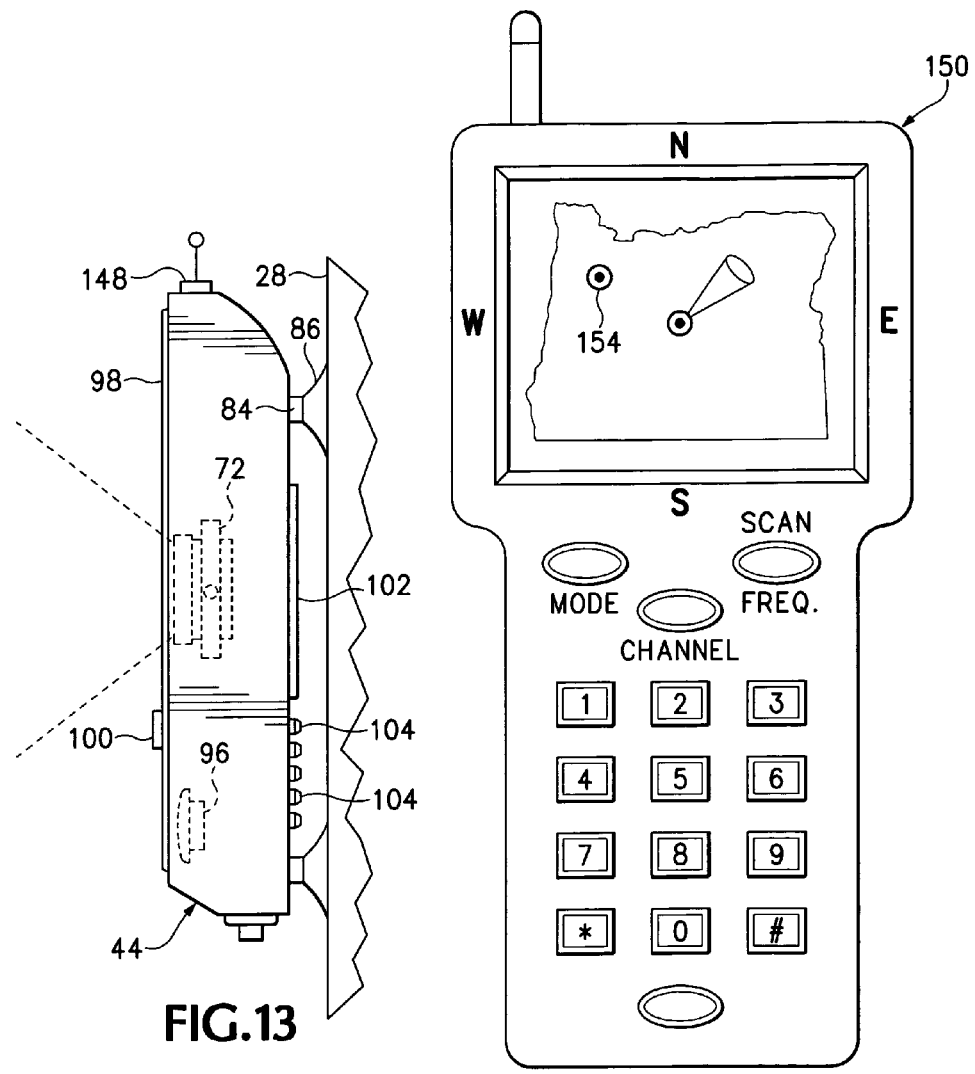
FIG.13
FIG.14
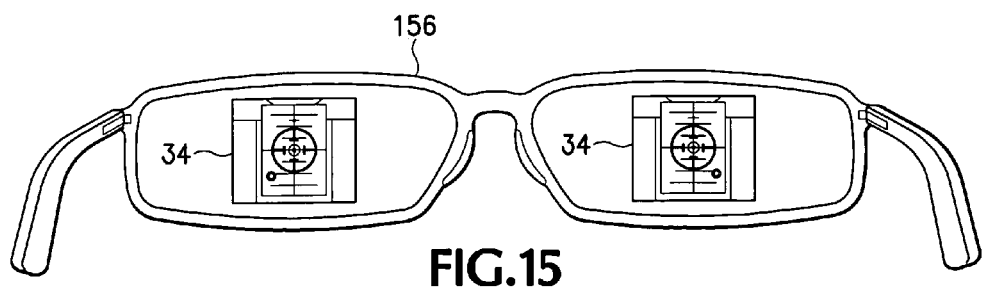
FIG.15

TOWING VEHICLE GUIDANCE FOR TRAILER HITCH CONNECTION

BACKGROUND OF THE INVENTION

The present disclosure relates to hitching a towing vehicle to a trailer or other vehicle to be towed and relates particularly to a guidance system and a method for its use in guiding a towing vehicle accurately to a position in which a trailer hitch can be coupled between the trailer and the towing vehicle.

Many trailers such as horse trailers and camping trailers are towed behind vehicles such as pickup trucks or sport utility vehicles. While small utility trailers can often be hitched to such a towing vehicle by lifting the tongue of the trailer manually or by moving the tongue of the trailer while its weight is supported on a stand including a wheel or skid, many trailers are large enough so that hitching them to a towing vehicle requires that the towing vehicle be backed accurately to a position in which a trailer hitch ball mounted on the towing vehicle is immediately beneath the coupler carried on the trailer or other vehicle that is to be towed.

On most such towing vehicles the trailer hitch ball or other hitch mating device is not in view of the operator of the vehicle. Even in a pickup truck with its tailgate lowered, the trailer hitch ball is normally hidden from the field of view of the pickup truck operator. When the towing vehicle is, for example, a larger truck or a sports utility vehicle loaded with equipment to be used during a long trip, for example, the rearward visibility may be even more limited, so that backing the towing vehicle requires use of side-mounted mirrors. Backing a towing vehicle accurately into position thus usually requires a driver operator to rely upon hand signals and voice commands from a second person in position to observe the approach of the towing vehicle toward the trailer. Even for an experienced team of a driver and a signaling person such an operation is difficult, since the final position of the towing vehicle must be accurate within a fraction of an inch.

Schultz U.S. Patent Application Publication No. 2005/1093603 shows use of a video camera mounted on the rear of a truck in connection with backing the truck to a required position for connection of a trailer hitch, but shows no way to indicate when the towing vehicle is precisely in the required position.

A team of a driver and a signaling person with little experience or who only rarely hitch a towing vehicle to a trailer can experience great difficulty, often requiring many approach attempts before the towing vehicle can be placed in the correct position. When the operation is not quickly successful, it can cause considerable disagreement, blame-laying, and unhappiness, thereby creating interpersonal stress between people who are attempting to achieve relaxation and enjoyment of travel with a recreational vehicle.

While towing a large trailer such as a recreational vehicle, visibility to the rear of the towing vehicle is greatly obstructed and restricted. Side mirrors on the towing vehicle afford only a limited the field of view, particularly behind the vehicle being towed, and backing such a large trailer therefore has often required guidance from a person on the ground, as when the trailer must be backed into a parking spot in a campground.

What is desired, then, is apparatus and a method for its use to facilitate backing a towing vehicle accurately into the required position where a trailer can be coupled to the towing vehicle without the need for directions or hand signals from a second person. Ideally, such apparatus could also be used to provide the operator of the towing vehicle with a clear view of an area behind the towing vehicle during the operation of moving the towing vehicle into position for coupling a trailer hitch, and also to provide a view of areas behind the towed vehicle.

SUMMARY OF THE DISCLOSURE

The apparatus and method disclosed herein, as defined in the claims included herein, which form a part of the present disclosure, provide answers to some of the aforementioned needs.

In one embodiment of an apparatus for guiding operation of a towing vehicle as it is moved to a position in which a trailer hitch can be mated, a camera mounted on the towing vehicle provides an image that can be viewed by the operator of the towing vehicle, showing the front of the trailer and a light beam projected from the towing vehicle toward a target mounted near a part of the hitch on the trailer or other vehicle to be towed.

In an embodiment of one aspect of the apparatus there is a target to be attached to a hitch component on a trailer that is to be towed, a light beam projector to be attached to a hitch component on the towing vehicle, and a camera to be carried on the towing vehicle in a location where the camera can form and transmit an image to a display that can be viewed by an operator of the towing vehicle as the towing vehicle is backed toward the required hitch-mating position for connecting the towing vehicle to the trailer.

In one embodiment of the apparatus a laser or other light beam projector is located on the towing vehicle so that it projects a light beam onto the target so as indicate visibly the relative positions of the hitch portions that must be connected.

According to one aspect of a method disclosed herein for facilitating moving a towing vehicle into a required position relative to a trailer, so that a pair of hitch components can be mated with each other to connect the trailer with the towing vehicle, a target for a light beam is provided on the trailer, a light beam projector is provided on the towing vehicle, and the towing vehicle is backed toward the required mating position of the hitch components while the operator observes an image of the target and the hitch component on the trailer, provided by a camera located on the towing vehicle, and steers the towing vehicle so that the light beam is projected onto the target and can be observed in the camera image as an indication of the position of the towing vehicle relative to the trailer.

The foregoing and other objectives, features, and advantages of the disclosed apparatus and method will be more readily understood upon consideration of the following detailed description taken in conjunction with the accompanying drawings.

BRIEF DESCRIPTION OF THE SEVERAL DRAWINGS

FIG. 1 is a simplified isometric view of a portion of a trailer tongue including a hitch coupler and a trailer hitch ball mounted on a drawbar portion of a trailer hitch on a towing vehicle, with the towing vehicle in position for the trailer to be coupled to the towing vehicle.

FIG. 2 is an isometric view at an enlarged scale of the trailer hitch ball and portion of a trailer tongue shown in FIG. 1, with an embodiment of a hitch alignment facilitating apparatus mounted on the trailer tongue and the hitch ball of the trailer hitch.

FIG. 3 is a partially diagrammatic view of a rear end of a towing vehicle and a trailer equipped with the hitch alignment facilitating apparatus shown in FIG. 2 with the towing vehicle in an initial position with respect to the trailer, in preparation for backing toward the trailer in order to hitch the trailer to the towing vehicle.

FIG. 4 is a side elevational view of parts of the trailer and towing vehicle shown in FIGS. 2 and 3, showing the towing vehicle and trailer-mounted modules of the hitch-alignment facilitating apparatus in their operative positions.

FIG. 6 is a view taken at an enlarged scale in the direction of the line 6-6 in FIG. 5, showing the front target portion of the trailer-mounted module of the hitch-alignment facilitating apparatus disclosed herein.

FIG. 7 is a sectional view of the trailer-mounted, or target, module of the apparatus, taken along line 7-7 in FIG. 5, at an enlarged scale.

FIG. 8 is a side elevational view of a portion of a trailer tongue with a trailer-mounted module carried on a retractable arm attached to the trailer tongue.

Figure 9:
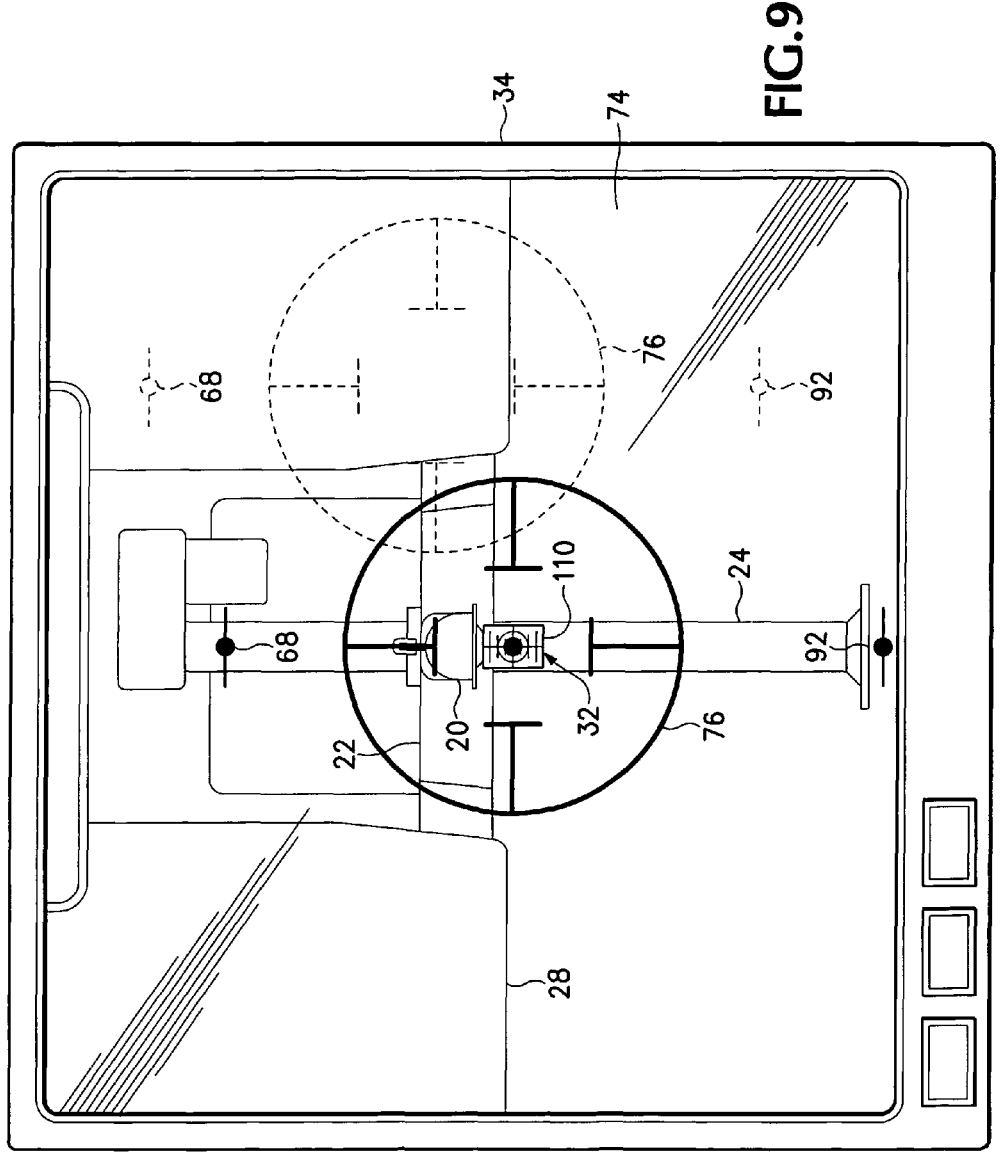

FIG. 9 is a view of a display monitor screen located within the towing vehicle in position for viewing by the towing vehicle operator and displaying an image transmitted by a video camera portion of the towing vehicle-mounted module of the hitch-alignment facilitating apparatus disclosed herein while the towing vehicle is moving backward toward the trailer with the towing vehicle and trailer are in the respective positions represented in FIG. 4.

Figure 10:
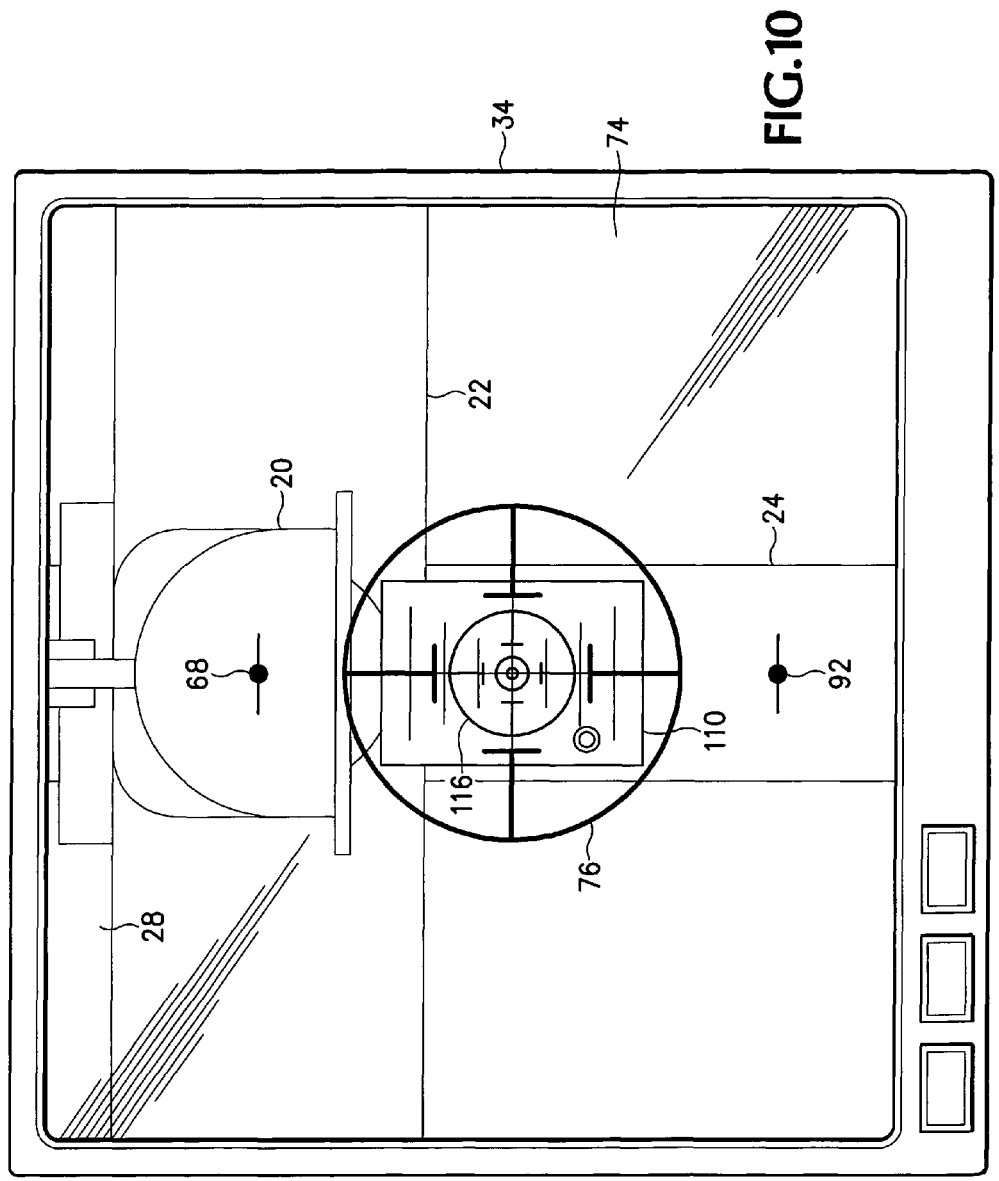

FIG. 10 is a view similar to FIG. 9, with the display monitor screen showing the image produced and transmitted by the camera with the towing vehicle approaching the trailer more closely.

Figure 5:
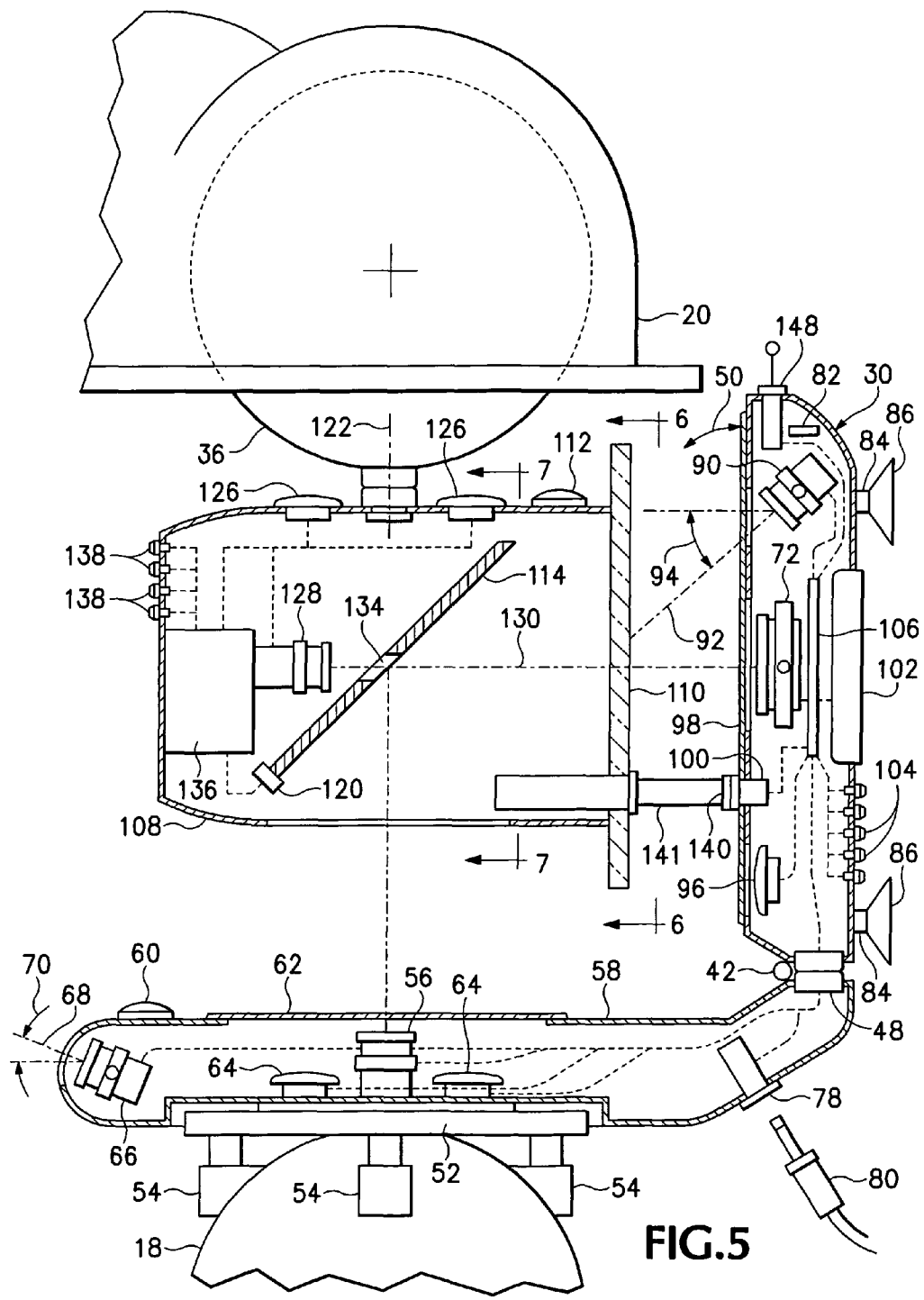
FIG. 5 is a partially sectional and simplified side view taken in the direction of line 5-5 in FIG. 2, showing a towing vehicle-mounted module of the hitch alignment facilitating apparatus shown in FIGS. 2, 3, and 4, mounted on a trailer hitch ball, as well as a trailer-mounted module of the apparatus and a coupler portion of a trailer hitch, with the coupler aligned with the trailer hitch ball.
Figure 11:
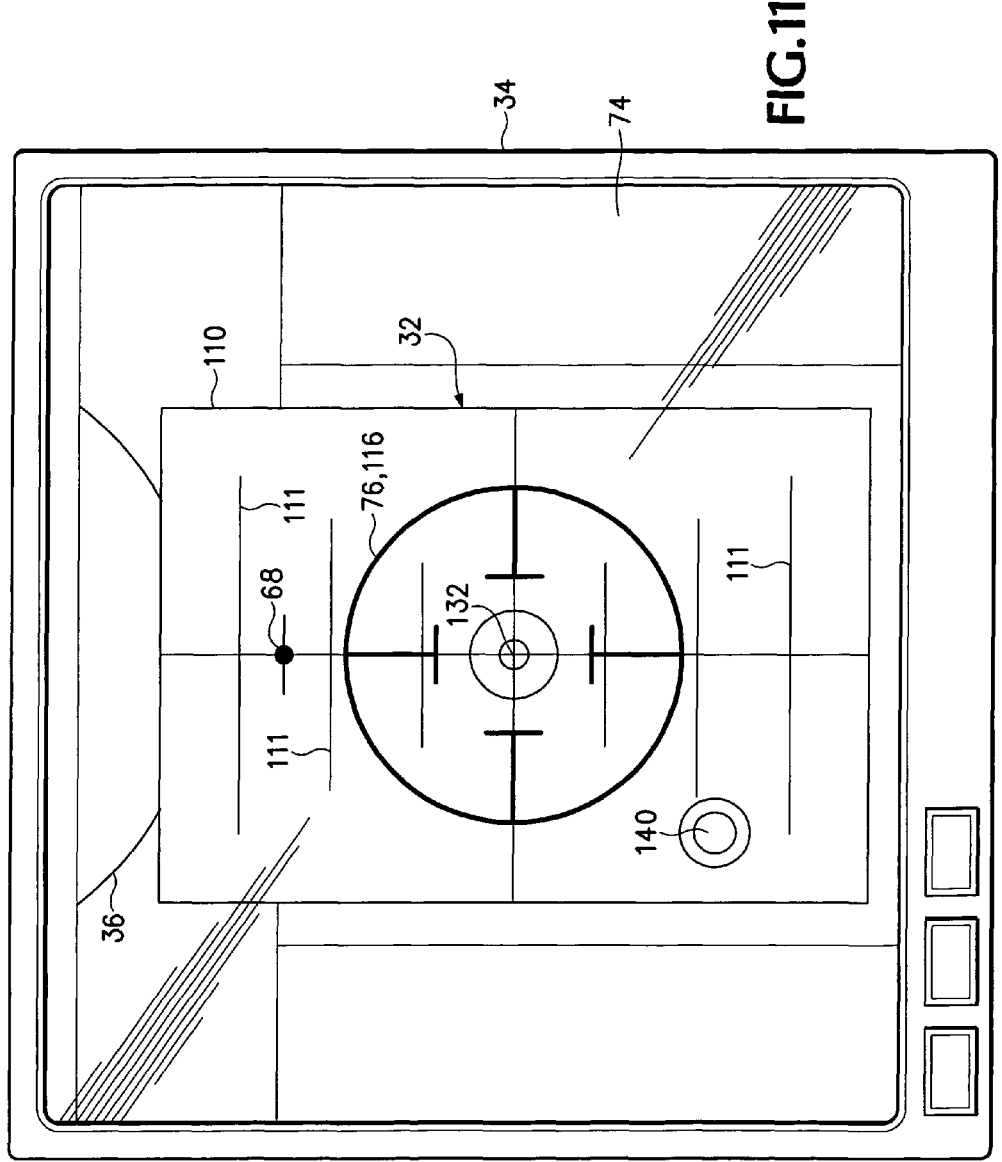

FIG. 11 is a view of the camera image shown in the display monitor in the towing vehicle operator's view when the towing vehicle is within a few inches from the hitch-mating position with respect to the trailer represented in FIG. 5.

Figure 12:
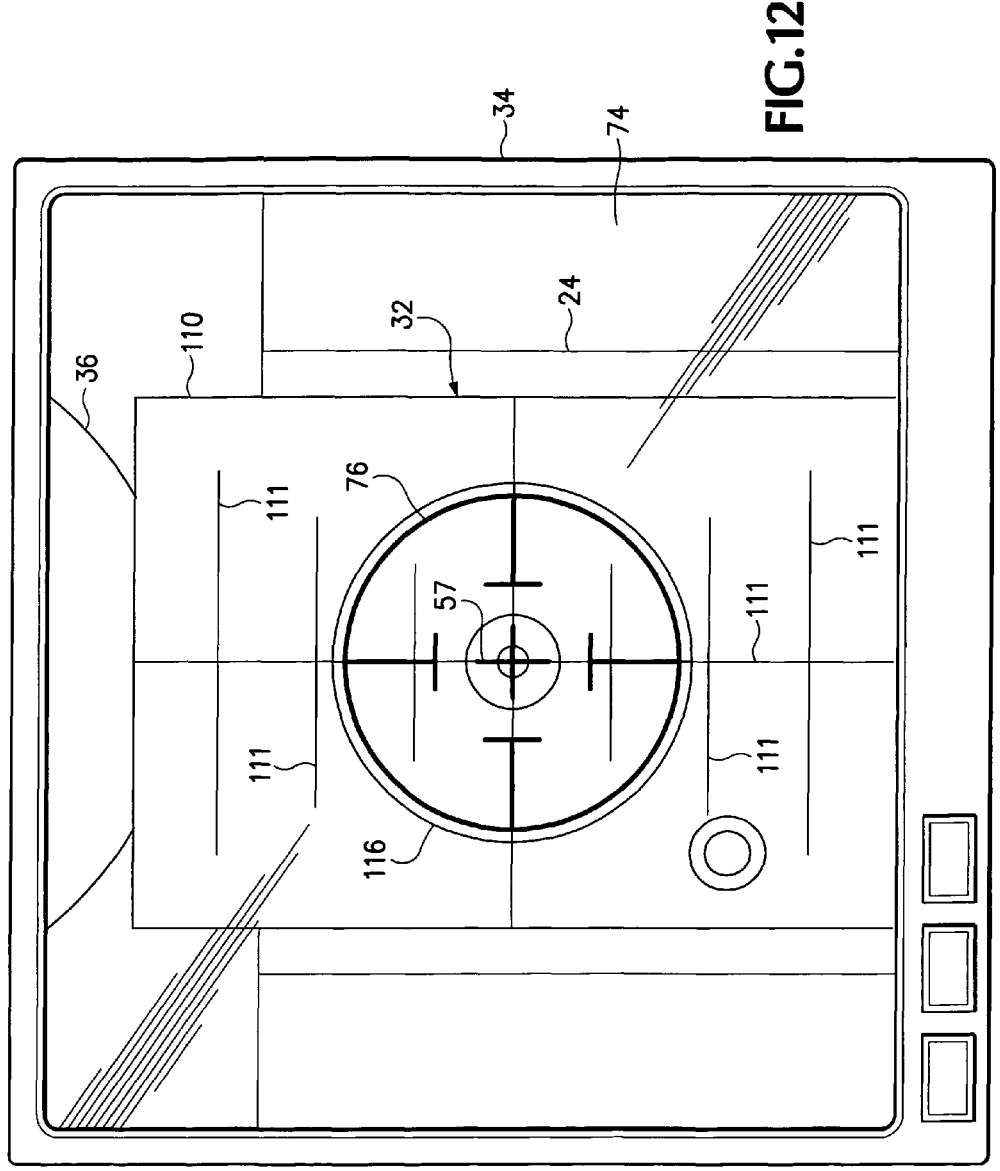

FIG. 12 is a view of the camera image shown in the display monitor in the towing vehicle operator's view when the towing vehicle and trailer are in the respective positions represented in FIG. 5.

FIG. 13 is a view showing a portion of the towing vehicle-mounted module of the hitch facilitating apparatus mounted on the rear of a trailer.

FIG. 14 is a simplified view of a hand-held separate module including a mobile telephone and a display showing an image transmitted by the camera in the towing vehicle module, similar to the image shown in FIG. 11.

FIG. 15 is a perspective view of a display device showing a pair of displays of the image transmitted by the camera in the towing vehicle module, in a device similar to a pair of glasses.

DETAILED DESCRIPTION OF EMBODIMENTS

Referring to the drawings which form a part of the disclosure herein, in FIG. 1 a trailer hitch for a towing vehicle (not shown) includes a short drawbar 16 on which is mounted a trailer hitch ball 18 as is commonly used in interconnecting towing vehicles with trailers ranging from the smallest in size up to those weighing several thousand pounds.

A trailer such as a recreational camping trailer includes a hitch coupler 20 on a its tongue 22. Except for the smallest of trailers, a lift device such as an adjustable jack stand 24 is associated with the tongue, either as a permanent attachment or temporarily mounted on the tongue 22 whenever the trailer is not connected to a towing vehicle. The lift device is used as shown schematically in FIG. 2 to raise the tongue of the trailer to a great enough height to permit the trailer hitch ball 18 or equivalent portion of the trailer hitch 16 on the towing vehicle to be placed beneath the trailer hitch coupler 20 that is mounted on the tongue 22 of the trailer, as shown in FIG. 2. When the coupler 20 mounted on the tongue of the trailer is located directly above the trailer hitch ball 18 on the towing vehicle the lift device 24 may be operated to lower the tongue of the trailer until the coupler 20 moves down to surround and rest upon the hitch ball 18, allowing the coupler to be fastened to mate the coupler securely with the trailer hitch ball. Once necessary electrical connections (not shown) are made for brakes, turning signals and brake lights, and after safety chains and load leveling levers, (not shown) are connected and adjusted, the lift device 24 can be operated to place the weight of the trailer tongue on the trailer hitch of the towing vehicle.

In FIG. 3 a towing vehicle, for example a pickup truck 26, is shown in an initial position ahead of a trailer 28, ready to be backed toward the trailer 28 to permit the hitch coupler 20 on the trailer tongue 22 to be mated with the trailer hitch ball 18 carried on the towing vehicle 26.

As shown in FIGS. 3 and 4, a hitch-alignment guidance system as disclosed herein includes in one embodiment a towing vehicle guidance module 30 mounted on the trailer hitch ball 18, a corresponding towed vehicle module 32 that is mounted on the tongue 22 of the trailer 28, and a video display device 34 (as shown in FIG. 9) located in view of the operator of the towing vehicle 26. In the embodiment shown herein, the towing vehicle module 30 is mounted adjustably on the hitch ball 18 of the towing vehicle 26 and thus can be rotated about any axis to place it into the correct alignment with respect to the towing vehicle 26. The corresponding towed vehicle module 32 may be equipped with a mounting ball 36 similar in size to the trailer hitch ball 18, and may be attached to the tongue 22 of the trailer by mating the mounting ball 36 with the trailer hitch coupler 20 on the trailer tongue 22. The mounting ball 36 may be made of a suitable metal or plastics material, with a plastics resin being preferred because of its lower cost and weight. When so mounted, the towed vehicle module 32 is also adjustable about any axis to align it for use of the apparatus disclosed herein to guide the towing vehicle 26 into position to mate the coupler 20 with the hitch ball 18.

Referring now also to FIG. 5, the towing vehicle module 30 may have a housing or case that can be folded about a hinge 42 into a compact configuration comparable in size to a telephone handset. The towing vehicle module may also be separable into two separate portions, by removal of an upper portion 44 from a generally horizontal base portion 46 so that the upper portion 44 can be used separately, as will be explained presently. A quick disconnect multi-conductor junction 48 is provided to permit the upper portion 44 of the towing vehicle module 30 to be folded about the hinge 42 as suggested by the arrow 50 to place the towing vehicle module 30 into its more compact configuration, or to permit the upper portion 44 to be removed from the base portion 46 for separate use.

The towing vehicle module 30 is shown mounted on the trailer hitch ball 18, to which it may be attached removably by a suitably strong magnet 52 housed in the base portion 46, and an arrangement of feet 54 that rest on the hitch ball 18, acting as a socket to support the towing vehicle module 30 so that it can be swiveled in any direction about the hitch ball 18. For use of the towing vehicle module 30 with a different sort of hitch arrangement instead of such a ball-and-socket hitch the towing vehicle module could be attached by using a different arrangement not shown herein but which should permit adjustment in all directions.

The base portion 46 of the towing vehicle module 30 includes a hitch alignment indicating light beam projector 56 such as a small laser of the type used in laser pointers, arranged to project a beam 57 of visible light directly upward, that is, in a direction perpendicular to a flat upper surface 58 of the base portion. The projector 56 is located so that when the upper surface 58 of the base portion 46 is horizontal the beam of light from the projector 56 will be directed vertically upwards above the center of the hitch ball 18. The light beam projector may be arranged to project a cruciform beam 57 upward, or it may project a simple, narrow beam to shine a small spot on a surface.

The base portion 46 of the towing vehicle module 30 preferably includes a level 60 to aid in placing the towing vehicle module 30 on the hitch ball 18 so that the upper surface 58 of the base portion 46 is horizontal when the towing vehicle module 30 is mounted and ready for use. Leveling may be accomplished using a single circular level 60 as shown or a pair of small elongate tubular levels oriented perpendicular to each other and aligned with the upper surface 58 of the base portion 46. The top of the base portion 46 may include a removable transparent plate 62 of strong plastic, and a pair of small lamps 64, such as upwardly directed LEDs, may be housed within the base portion 46 to provide illumination during nighttime use of the hitching guidance system.

A small long distance guidance light beam projector 66, which may also be a small laser, is mounted at the rear end of the base portion 46 and is arranged to project a beam 68 of light rearwardly from the towing vehicle to serve as a long distance guide and a distance indicator when the towing vehicle module 30 is correctly mounted and adjusted. The position of the light beam projector 66 may be adjustable with respect to the base portion 46 in order to project the beam of light at a selected acute angle 70 above horizontal. The angle 70 may be selected so as to make the beam of light 68 strike the front of the trailer 28 or other vehicle to be towed in a visible position when the towing vehicle 26 is separated from the trailer 28 by a selected distance. Thus in one embodiment of the device the light beam projector 66 may be a low power laser oriented at an angle 70 of 22.5 degrees above horizontal, so that the beam 68 of light will strike the front of a camper trailer, depending on its height, when the towing vehicle 26 is several feet ahead of the hitch mating position in which the trailer 28 can be coupled to the towing vehicle 26.

Mounted on and extending upwardly from the base portion 46, the upper portion 44 of the towing vehicle module 30 includes an electronic image-forming device such as a video camera 72 arranged to provide an electrical image signal that can be transmitted either wirelessly or by wire, for continuous display on a monitor screen 74 of the video display device 34 located in the operator's cab of the vehicle where it can be seen conveniently by the vehicle operator. For example, the video camera 72 may be a small digital video camera including a sensing device capable of providing digital video image transmission of suitable definition for display on the monitor screen 74. A target reticle 76 may be included in the camera so as to be visible in the image transmitted by the camera to the monitor screen 74, as shown in FIG. 8, as an indication of the center of the field of view of the camera. The camera 72 includes a self-leveling lens and automatically focusing arrangement in one embodiment. A connector 78 is provided for a cable 80 for signal transmission and for external power to be provided from the electrical system of the towing vehicle 26 to the towing vehicle module 30.

The upright upper portion 44 of the towing vehicle module 30 may include a level 82 arranged to indicate whether the upper portion 44 is correctly aligned in a vertical orientation when the base portion 46 is mounted with its upper surface 58 horizontal, to insure that the entire towing vehicle module 30 is correctly aligned.

A set of hanger receivers 84 may be mounted on the rear side of the upper portion 44, either alone or accompanied by suction cups 86 so that the upper portion 44 can be mounted in a desired location, as on the rear of a trailer 28, either by the use of a separate hanger (not shown) or by the suction cups 86.

An upper, or short range guidance, light beam projector 90, which may also be a small laser pointer light, may be provided near the top of the upper portion 44 of the towing vehicle module 30, and preferably has a light beam 92 of a different color from the beam 68 of the lower, or long distance guidance light beam projector 66 in the base portion 46 of the towing vehicle module 30. The short range guidance light beam projector 90 may be arranged to project a beam 92 of light rearward and at an acute angle 94 below the horizontal. For example, in one embodiment, as shown in FIG. 5, the short range guidance light beam projector 90 is arranged to direct the light beam 92 at an angle 94 of 45 degrees below the horizontal, to provide an indication of when the towing vehicle 26 is closely approaching the hitch-mating location where it can be coupled to the trailer 28, as will be explained in greater detail presently.

Located below the camera 72 there may be a small lamp 96, such as an LED, that may be utilized at night to help illuminate the area behind the towing vehicle 26, and particularly to illuminate the towed vehicle, or trailer-mounted, module 32 as the towing vehicle 26 approaches the trailer 28 or other vehicle that is to be towed. Both the camera 72 and the lamp 96 may be mounted on the face of the upper portion 44, and both may be covered by a transparent cover 98 that can easily be wiped clean, but which protects the interior components of the upper portion 44 from the weather or water that may be splashed toward the towing vehicle module during its use. Ideally both the towing vehicle module 30 and the towed vehicle module 32 are insulated and waterproof, to withstand use in wet weather.

Thus, as may be seen in FIGS. 3 and 4, when the towing vehicle module is mounted on the trailer hitch ball, projected light beams 57, 68, and 92 from the three light beam projectors 56, 66, and 90 are coplanar, and the alignment light beam projector 56 is located centrally above the top of the trailer hitch ball 18 and aimed directly upward.

Also located adjacent the front face of the upper portion 44 may be a switch, such as a magnetically operated reed switch 120, which may be actuated as will be explained presently to provide an audible indication when the towing vehicle 26 is nearly in the required position for mating the trailer hitch coupler 20 and hitch ball 18 to each other.

A suitable rechargeable electric battery 102 is housed within the upper portion 44 to provide required electrical current for the camera 72, the lasers or other light beam projectors 56, 66, and 90, and the lamps 64 and 96 included in the towing vehicle module 30 when power is not available from the cable 80. A solar cell and an associated recharging circuit may also be provided to maintain a charge in the battery 102. This can be particularly valuable in case of separate remote use of the upper portion 44, as will be explained below. Suitable connecting wiring, shown greatly simplified, is provided, and manually operable control switches 104 are mounted in a convenient location on the rear side of the upper portion, and include, for example, respective on-off switches for the long distance and short range light beam projectors 66 and 90, the hitch alignment light beam projector 56, the digital camera 72, and the lamps 64 and 96.

An electronic circuit board 106 may be mounted within the upper portion 44 of the towing vehicle module 30 and may contain circuitry related to wireless transmission of the video camera images to the display device 34 and capable of transmitting a video signal that can be received at distances up to several hundred feet from the upper portion 44, as well as for a satellite global positioning system receiver and a related locator beacon transmitter optionally included in the upper portion 44 of the towing vehicle mounted module 30, and other circuitry related to the camera 72, the light beam projectors 56, 66, and 90, and the lamps 64 and 96.

The target, or trailer-mounted module 32 includes a body housing 108 and may have a transparent planar front target face 110 including a calibrated graticule 111 or grid of parallel horizontal lines and a vertical center line. The target body housing 108 may include a suitable level 112, and the orientation of the target body can be adjusted by moving the ball within the trailer hitch coupling 20, or by adjusting another movably adjustable connector, (not shown), by which the trailer-mounted module 32 may be attached to the trailer tongue 22 or the trailer hitch coupling 20 mounted on the vehicle that is to be towed. The position of the target body housing 108 is adjusted using the level 112, to place the front target face 110 in a vertical orientation.

Located within the target body housing 108 and spaced rearwardly from the front target face 110 is an inclined target plate 114 of transparent material such as Plexiglas on which a target reticle 116 is inscribed clearly and distinctly enough to be visible to the camera 72 through the front target face 110 when the towing vehicle approaches closely enough to the vehicle 28 that is to be towed. The target reticle 116 is located so as to be centered directly beneath the ball receptacle of the trailer hitch coupler 20 when the housing 108 is level. A front or lower, surface 118 of the inclined target plate 114 may be ground or etched so as to make a beam or spot of light falling upon the surface 118 clearly visible to the camera 72, as seen through the front target face 110. A small lamp 120, such as a small LED, may be used to provide edge illumination of the inclined target plate 114. The target shape reticle 116 is contrastingly marked on the inclined target plate 114, so that light from the edge lamp 120 is clearly visible in daylight or at night to allow the digital camera 72 to see the target reticle 116 clearly.

The target housing body 108 may be attached to the mounting ball 36 or other support structure by a swivel defining an axis 122 parallel with the front, target face 110, so that the target body housing 108 may be moved through an angle 124 (see FIG. 3A) about the axis 122 of the swivel to direct the front target face 110 toward the towing vehicle 26 while the towing vehicle is being backed into the hitch mating location, as will be described in greater detail presently. For the sake of convenient use and the best results, the swivel axis 122 should extend through the center of the target reticle 116.

Small lamps 126 which may, for example, be LEDs, are provided in the top of the body housing 108 to shine upwardly and illuminate the tongue 20 and adjacent parts of the trailer 28 to assist in making the trailer 28 or other vehicle to be towed easily visible in the field of view of the camera 72 included in the towing vehicle module 30.

A tongue height and directional alignment light beam projector 128, such as a small low powered laser, is mounted in the target body housing 108 and is located and aimed so as to direct a beam 130 of visible light directly through the front target at a center point 132 appropriately marked on the front target face 110, as shown in FIG. 6. This beam 130 of light is useful, as will be explained more fully presently, in initial preparation for backing the towing vehicle 26 toward the trailer 28 so as to place the towing vehicle in the required hitch-mating position for coupling the trailer hitch. A horizontal central opening 134 may be provided through the inclined target plate 114, and the projected light beam 130 is directed through that hole. Alternatively, the inclined target plate 114 may be imperforate, and the light beam projector 128 may be located within the housing 108 so that the beam 130 of light, after refraction by the inclined target plate 114, passes through the center 132 of the target front face 110.

Appropriate electrical batteries 136 are provided within the target body housing 108 to power the lamps 120, 126 and the light beam projector 128, and appropriate switches 138 are provided to control operation of the lamps 120, 126 and the light beam projector 128.

A small magnet 140 may be carried in a support such as a small telescoping tubular housing 142 which permits the magnet to extend forward a small distance, such as about 1½ inches, from the target front face 110. The magnet 140 is located where it is aligned with the location of the magnetic reed switch 100 in the towing vehicle module 30 when the towing vehicle is located in the optimal hitch-mating position for mating the coupler 20 with the hitch ball 18.

As an alternative to holding the ball 36 in the socket of the coupler, the trailer-mounted module 32 may be carried on a retractable and extendable support arm 142 mounted on the trailer tongue 22 as shown in FIG. 8. A semicircular yoke 143 holds the trailer mounted module 32 on the arm 142 so that it can be rotated about the swivel axis 122, with the swivel axis extending through a point about which the trailer hitch coupling on the trailer 28 is rotatable with respect to the towing vehicle 26 when the trailer hitch parts are mated and ready for use. When not in use the towed vehicle module 32 is carried in the retracted position shown in broken line. At least in such an embodiment, the trailer-mounted, or towed vehicle, module 32 should be waterproof, so as to withstand immersion as when carried on a boat trailer during launching or recovery of a boat.

Figure 8A:
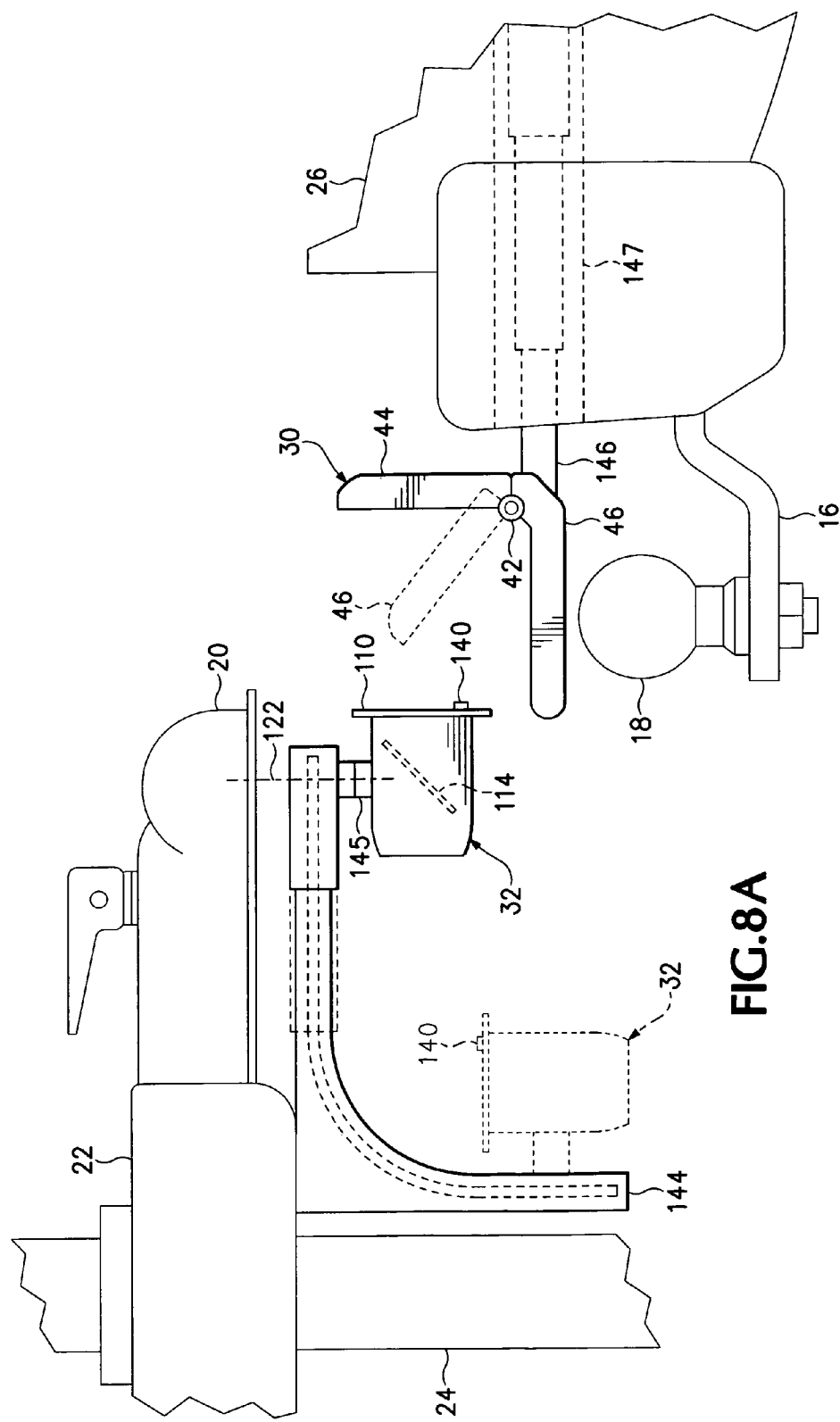
FIG. 8A is a side elevational view of a portion of a trailer tongue with a retractable trailer-mounted module on a slide track attached to the trailer tongue, as well as a portion of a towing vehicle bumper and trailer hitch, with the towing vehicle module carried on a retractable slide.

As another alternative for mounting the trailer-mounted module 32, as shown in FIG. 8A a slide track 144 may be provided on the trailer tongue to hold the towed vehicle, or trailer-mounted, module 32. With the trailer-mounted module 32 located as shown in solid line the reticle 116 on the inclined target plate 114 is centered below the coupler 20 for use. The module may be held by a swivel joint 145 so that it can be adjustably pivoted about the axis 122 as explained above. When not in use the module 32 can be withdrawn along the slide track 144 and carried in a retracted position and a front position of the slide track 144 may be telescoped back over the rear part, as shown in broken line in FIG. 8A, so as not to interfere with the trailer hitch ball 18 and socket 20.

Similarly, a telescoping support slide 146 for the towing vehicle module 30 may be mounted in a specifically provided storage location such as a protective compartment 147 in a rear end portion of the towing vehicle 26, adjacent the trailer hitch. The towing vehicle module 30 can be supported on the support slide 146, either retracted into the storage location, or with the slide 146 extended to a position in which the towing vehicle module 30 is located directly above the hitch ball 18. In the extended position as shown in solid line in FIG. 8A, the towing vehicle module 30 is used in the same manner as when mounted on the hitch ball 18 as shown in FIGS. 2-5.

The towed vehicle, or trailer-mounted, module 32 may be mounted as shown in FIGS. 8 and 8A as original equipment, or as after market equipment. The towing vehicle module 30 may also be mounted as shown in FIG. 8A as original equipment, or as an option for towing vehicles in which a rear end structure may include or may be modified easily to include a storage compartment 147.

The video display device 34 may be mounted as seen in FIG. 9, on the dashboard of the pickup truck or other towing vehicle 26, either as added equipment, or built into the dash of the towing vehicle 26 as original equipment, in which case it may be designed for multiple uses such as to display GPS mapping systems or other vehicle operational information of interest, as well as being electrically connected so that the monitor screen 74 is available additionally for use in connection with the hitch-alignment facilitating apparatus disclosed herein. It could also be built to interface with existing original equipment dash-mounted displays, portable monitors, laptop computers, or portable GPS and mobile telephone display units.

As shown in FIG. 9 the monitor screen 74 displays an image of the trailer 28 as seen by the camera 72 when the towing vehicle module 30 is properly mounted and adjusted, and with the towing vehicle 26 in position ahead of the trailer 28, ready to begin backing toward the trailer. The transparent front target face 110 of the trailer mounted, or target, module 32 is clearly visible, and the target reticle 116 on the inclined target plate 114 is also visible through the transparent front target face 110. Additionally, the reticle 76 in the camera 72 is also visible in the monitor screen 74, as are the light beam, or spot, 68 which may be of a first color, for example red, projected from the lower or long distance guidance light beam projector 66 of the base portion 46 of the towing vehicle module 30 and another light beam, or spot, 92, which may optionally be of a second color such as green, projected by the upper, or short range guide light beam projector 90 carried in the upper portion 44 of the towing vehicle module 30. In addition to or instead of a small spot the light beams 68 and 92 may be projected as horizontal lines by the projector.

Trailer Hitching Procedure

Figure 3A:
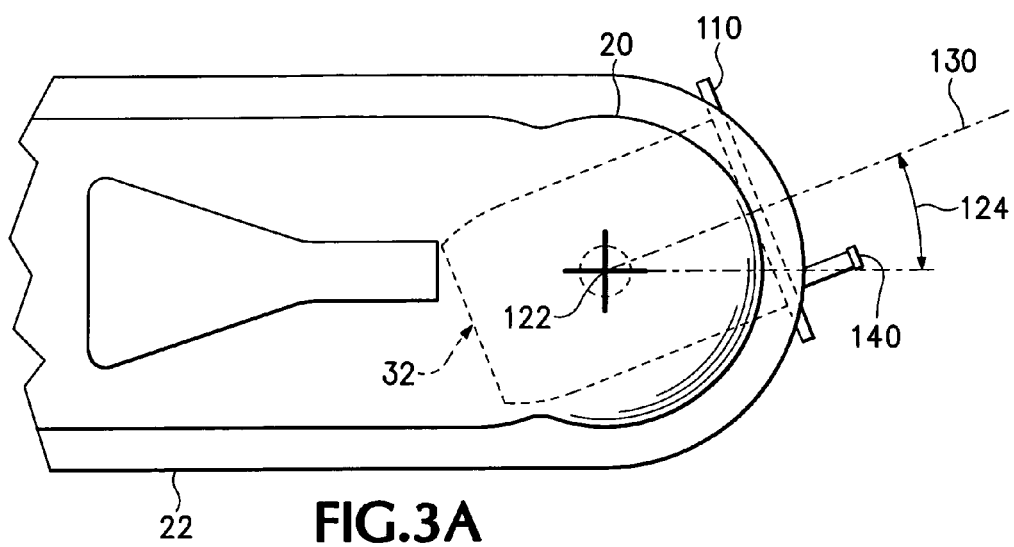
FIG. 3A is a top plan view of a portion of the trailer tongue and a trailer-mounted module as shown in FIG. 3.

In order to utilize the hitch alignment facilitating system described above for placing the towing vehicle 26 in the correct location for mating the hitch coupler 20 on the trailer tongue 22 to the trailer hitch ball 18 on the towing vehicle 26, the target, or trailer-mounted, module 32 is attached to the coupler 20 on the tongue 22 of the trailer 28 or other vehicle that is to be towed, and the towing vehicle module 30 is mounted on the trailer hitch ball 18 of the towing vehicle, as described and illustrated above. When the trailer-mounted module 32 is level the swivel axis 122 is vertical, and the body or housing 108 is rotated about the swivel axis 122 until at an angle 124 the beam 130 of light from the light beam projector 128 is directed toward the towing vehicle module 30, as shown in FIGS. 3, 3A, and 4. If both the towing vehicle 26 and the vehicle 28 that is to be towed are on flat, level ground, the trailer tongue lift 24 can then be operated to bring the tongue 22 of the trailer 28 to a height at which the beam 130 of light projected from the light projector 128 is directed toward the lens of the camera 72 in the towing vehicle module 30. This will place the trailer hitch coupler 20 at a preferred height to provide clearance for the base portion 46 of the towing vehicle module 30 to pass beneath the trailer-mounted module 32 of the hitch-guiding apparatus as the towing vehicle 26 is backed into the hitch-mating position. Once the height of the trailer tongue 22 has been adjusted the height guidance light beam 130 can be turned off by the appropriate switch 138.

With the towing vehicle module mounted and level as described above, the central axis of the field of view and the reticle 76 of the camera 72 should be aimed directly rearwardly as indicated by the right angle 152 in the horizontal plane, shown in FIG. 3, and the laser or other light beams 68 and 92 from the guidance beam projectors 66 and 90 are then also directed rearwardly. The video camera 72 is then turned on, and its view is displayed as an image on the monitor screen 74 in the towing vehicle, in view of the vehicle operator, as shown in FIG. 9. The towing vehicle 28 is then moved backward toward the tongue 22 of the trailer, which is clearly shown on the monitor screen 74. As the towing vehicle 26 approaches the trailer 28 the towing vehicle 26 should be steered carefully to keep the target or towed vehicle module 32 centered in the image of the camera reticle 76 rather than to one side as shown in broken line. The light beam 68 from the long distance guidance light beam projector 66 will be visible where it impinges on the front of the trailer 28, once the towing vehicle is within several feet from the required position for connection of the trailer hitch coupler 20 to the trailer hitch ball 18. The distance where the light beam 68 can be observed is determined by the angle 70 at which the long distance guidance beam is oriented above horizontal, the length of the trailer tongue 22, and the height of a front surface of the trailer 28 on which the light beam 68 can fall.

As the towing vehicle 26 is backed closer toward the required hitch mating location, the long distance guidance light beam 68 will move downward along the front of the trailer, while the image of the front target face 110 on the front of the towed vehicle module 32 will grow larger in the monitor screen 74 as the camera 72 moves closer to it, as shown in FIG. 10. If the trailer and the towing vehicle are on anything other than flat level ground, it is desirable, when the towing vehicle 26 and the trailer 28 are separated by no more than a few feet, to confirm that the trailer tongue 22 is at the required height relative to the trailer hitch ball 18 on the towing vehicle, as by again operating the height adjustment light beam projector 128 and, if necessary, adjusting the lift 24 supporting the trailer tongue 22 so that the height adjustment light beam 130 is directed toward the lens of the camera 72.

The laser beam 68 from the long range guidance beam projector will impinge on the trailer at a location that appears to be vertically above the target front face 110, and as the towing vehicle module 30 approaches closer to the trailer mounted module 32 the long distance guidance light beam will become visible on the target front face 110 when the hitch ball 18 is several inches from the coupler 20, as shown in FIG. 11.

As the towing vehicle 26 is moved further backwards toward the trailer 28, with the target center 132 on the target front face 110 of the towed vehicle module 32 kept centered within the camera lens reticle 76, the upwardly inclined light beam 68 of the long distance guidance light beam projector 66 will strike the top of the front target calibrated graticule 111, indicating that the towing vehicle is closely approaching the hitch mating location. If the trailer hitch coupler 20 is adjusted correctly in height the horizontal lines of the graticule 111 will give an accurate indication of the distance through which the towing vehicle 26 still needs to move rearwardly to the desired hitch-mating position. The beam 68 will move downward along the front target face 110 as the base portion 46 of the towing vehicle module 30 approaches the front target face 110 until the lower light beam 68 progresses down to the bottom of the front target face 110 just before the base portion 46 of the towing vehicle module 30 passes beneath the target face 110. It should be apparent to the towing vehicle operator viewing the monitor screen 74 if the height of the trailer tongue is not correct, as the center 132 of the front target face 110 will appear to be too high in the lens reticle 76 of the camera 72 if the trailer tongue 22 is too high, or will appear too low in the lens reticle 76 field of view of the camera 72 if the trailer tongue 22 is too low. If such misalignment appears then the operator should stop backing toward the trailer 28 and adjust the height of the trailer tongue 22 to be sure that the towing vehicle hitch ball will be able to pass properly beneath the tongue of the trailer, and that the base portion 46 of the towing vehicle module 30 can pass beneath the target, or towed vehicle module 30.

Once the upwardly inclined long distance guidance laser beam approaches the bottom of the front target plate the downwardly inclined light beam 92 from the short range guidance light beam projector 90 at the top of the upper part 44 of the towing vehicle module 30 should become visible at the bottom of the front target face 110 if the trailer tongue 22 is at the correct height with respect to the trailer hitch ball 18 on the towing vehicle. When the green laser beam 92 of the upper laser light beam projector 90 is visible on the front target calibrated graticule 111 the towing vehicle 26 is very close, within about two inches, to the desired hitch-mating location. The light beam 57 from upwardly directed hitch alignment light beam projector 56 in the base portion 46 of the towing vehicle module 30 should then be visible to the camera 72 at the top of the inclined target plate 114 within the towed vehicle module 32, as shown in broken line in FIG. 7. At about that distance the magnet 140 may activate the reed switch 100, causing an audible signal to be sounded by the display device 34.

As the towing vehicle 26 is backed further the laser beam 57 will appear to move down across the target reticle 116 defined on the inclined etched target plate 114, until, when the towing vehicle is in the correct position, as shown in FIG. 12 the laser beam 57 will appear to be centered in the target on the inclined etched target plate. The towing vehicle operator should then stop the towing vehicle 26, set its brakes, and then remove both modules 30 and 32 of the hitch guidance apparatus from their respective places on the towing vehicle trailer hitch ball 18 and the trailer hitch coupler 20 and then lower the trailer tongue 22 to mate the coupler 20 with the trailer hitch ball 18.

Additional Functionality

While the principal utility of the apparatus described above is in enhancing the ability to back a towing vehicle 26 easily and accurately to a mating location where a trailer hitch can be coupled, the ability to transmit a video image wirelessly from the camera 72 to the monitor screen 74 near the towing vehicle driver's position makes the upper portion 44 of the towing vehicle module 30 otherwise conveniently useful, both in connection with backing the trailer 28 and while towing the trailer 28 along a highway. Since the upper portion 44 of the towing vehicle module 30 can be removed from the base portion 46 by use of the quick disconnect coupling 48, the upper part 44 can be mounted on the rear of the trailer 28, as shown in FIG. 13, either by use of the suction cups 86 or by the use of an appropriate hanger (not shown) and the hanger receivers 84. Video images from the camera 72 can then be transmitted wirelessly to the display device 34 in the towing vehicle 26, so that the driver of the towing vehicle can see what is behind the trailer 28 as the trailer is backed into a parking position, making it much easier to park the trailer safely. Additionally, the camera 72, when mounted on the back of the trailer 28, can be used while towing the trailer along a highway, to provide a much better view of vehicles following the trailer 28 than is normally available simply by using ordinary side view mirrors on the towing vehicle 26.

Within a limited distance from the towing vehicle, the camera 72 can be used by a person carrying the unit to transmit a view to the video display device 34 in the towing vehicle 26. A suitable wireless receiver and antenna capable of receiving the transmitted signal from the towing vehicle module and providing both audio and video output signals to the monitor, may be connected with the monitor.

Optionally, the towing vehicle module 30 can include a Global Positioning System (GPS) satellite unit and a beacon transmitter 148 contained in the upper portion 44, as shown in simplified form in FIG. 5. The GPS navigation system may be designed to communicate with commercially available satellite radio and mapping services. The GPS unit included in the upper portion 44 can thus be carried by a person venturing away from the location of the towing vehicle 26, as when the towing vehicle 26 is left in a camp and a person hikes into nearby wilderness, where the beacon transmitter, coupled with the GPS unit in the upper portion 44, is available as an emergency beacon transmitting its location in case the user is injured or becomes disoriented.

In connection with use of the GPS beacon, a separate handheld mobile telephone and beacon monitor unit 150, such as that shown in FIG. 14, may be used to determine and display the location of a person carrying the upper part of the towing vehicle module. This acts as a safety feature in conjunction with use of the upper portion 44 of the towing vehicle module 30, which, in one embodiment of the device, may include a low power radio telephone able to conduct two-way communications with such a separate self-contained handheld unit 150. Alternatively, the handheld unit 150 may include circuitry capable of utilizing existing cellular or satellite mobile telephone or wireless computer communications systems to receive and display the GPS beacon data showing the location 154 of the upper portion 44 of the towing vehicle module 30 carried by a person at some distance from the towing vehicle in which the video display device 34 is installed and operated. The beacon monitor unit could thus be used with appropriate identifying codes to locate the upper portion 44 either locally or at great distances, depending on the associated communication system used.

The monitor screen 74 of the display device 34 in the towing vehicle 26 may be equipped and programmed with a touch screen control interface for use in connection with programming a GPS navigation system setting to synchronize the display device 34 and the upper portion 44 of the towing vehicle module 30 with a satellite navigation system in connection with monitoring the location of the portable upper portion 44 of the towing vehicle module 30.

As an optional accessory, a portable, wearable visual display may be provided by a wearable display device 156 similar to a pair of virtual reality glasses known for use in connection with video computer gaming technology. One or two video display devices 34 may be provided in the wearable display device 156 for use instead of or as well as the dash-mounted video monitor screen 74, to provide an image from the video camera 72 to the operator of the towing vehicle 26, while the towing vehicle is backed into position for mating the trailer 28 to the towing vehicle 26.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. Apparatus for guiding an operator of a towing vehicle being backed toward a hitch-mating position with respect to a vehicle to be towed, comprising:
   (a) a rearwardly directed video image forming device carried on the towing vehicle;
   (b) an alignment indicating light beam projecting device mounted on the towing vehicle and aimed to project a beam of light directly upward;
   (c) a video display device located in view of the operator of the towing vehicle and arranged to display an image generated by the video image forming device; and
   (d) a target mounted on the vehicle to be towed, in a position directly beneath a coupler portion of a trailer hitch, the target including an inclined target plate and the light beam projecting device being mounted on a hitch ball and said target plate being located so as to be struck by a beam of light projected directly upward from the light beam projecting device, and the video image forming device being mounted where the target will be within the field of view of the video image forming device, when the towing vehicle is near a hitch-mating position with respect to the vehicle to be towed.

2. The apparatus of claim 1 wherein the target is included in a trailer mounted device which includes a light beam projector oriented in a predetermined direction with respect to the target, and wherein the trailer mounted device is adjustably movable to cause the light beam projector to project a beam of light toward a predetermined position on the towing vehicle and thereby adjust the position of the target with respect to the towing vehicle.

3. The apparatus of claim 1 wherein the image forming device is a digital video camera.

4. The apparatus of claim 1 wherein the light beam projecting device includes a low power laser.

5. The apparatus of claim 3 wherein said digital video camera is associated with a wireless signal transmitter arranged to transmit said image to said video display device.

6. The apparatus of claim 1 wherein the video image forming device is removable from the towing vehicle and operable remotely to communicate a video image wirelessly to said video display device.

7. The apparatus of claim 1 including a long distance guidance light beam projector arranged to project a beam of light rearwardly from the towing vehicle at an acute angle above a horizontal plane so as to fall visibly onto a front surface of the vehicle to be towed.

8. The apparatus of claim 7 wherein the target includes a front target face located where said beam of light from said long distance guidance light beam projector will fall visibly on the front target face when the towing vehicle approaches within a predetermined distance to the hitch-mating position.

9. The apparatus of claim 8 wherein the front target face includes a calibrated distance-estimation grid.

10. The apparatus of claim 8 including a close range guidance light beam projector arranged to project a beam of light at an acute angle below a horizontal plane so that said beam of light therefrom will fall visibly on said front target face when said towing vehicle is within a predetermined short distance from said hitch-mating position.

11. The apparatus of claim 1 wherein said video image forming device is a video camera including a reticle visible in an image produced by said camera.

12. The apparatus of claim 1 wherein said video display device includes a video image display arranged to be worn on the head of said operator, so as to be in view without said operator having to turn his head.

13. Apparatus for guiding an operator of a towing vehicle being backed toward a hitch-mating position with respect to a vehicle to be towed, comprising:
   (a) a primary hitch alignment light beam projector mounted on a hitch ball and aimed directly upward and arranged to project a beam of light directly upward along a pivot axis defined by and extending from a hitch part carried on the towing vehicle;
   (b) a target located directly beneath a hitch coupler on a vehicle to be towed, the target including a target plate located so as to be struck by the beam of light projected directly upward from the light beam projector when said towing vehicle is near said hitch-mating position;
   (c) a camera carried on the towing vehicle in a location where the camera can form an image of the target, both when the towing vehicle is positioned ahead of and ready to be backed toward the hitch-mating position and when the towing vehicle is in the hitch-mating position with respect to the vehicle to be towed; and
   (d) an image display device located in view of the operator of the towing vehicle and arranged to display an image of at least a part of a field of view of the camera.

14. The apparatus of claim 13 including a long distance guidance light beam projector mounted on the towing vehicle and projecting a distance estimating light beam at a predetermined upwardly inclined angle and toward the vehicle to be towed.

15. The apparatus of claim 14 wherein said long distance guidance light beam projector is aimed directly rearward from the towing vehicle.

16. The apparatus of claim 13 wherein the camera is adapted to provide an image of a reticle aligned with its field of view.

17. A method for moving a towing vehicle into a desired hitch-mating position with respect to a trailer, comprising:
   (a) providing a video camera on the towing vehicle near a trailer hitch part intended to be mated with a trailer hitch coupler connected with a tongue of the trailer;
   (b) projecting a beam of light directly upward from a light beam projecting device aimed directly upward and mounted on a hitch ball on the towing vehicle;
   (c) providing a visual target including an inclined target plate mounted near the trailer hitch coupler connected with the tongue of the trailer and located so as to be struck by a beam of light projected directly upward from the light beam projecting device when the towing vehicle is near the hitch-mating position;
   (d) observing a video image of the target on a video imaging device while operating the towing vehicle;
   (e) moving the towing vehicle rearwardly toward the trailer hitch coupler while observing the video image;
   (f) steering the towing vehicle in response to observing the video image, while moving the towing vehicle rearwardly until the beam of light projected directly upward impinges on the inclined target plate mounted near the trailer hitch coupler; and
   (g) observing a video image of the inclined target member including an image of the beam of light projected directly upward impinging upon the inclined target plate while moving the towing vehicle further toward the desired hitch-mating position for mating the trailer hitch coupler connected with the tongue of the vehicle to be towed with the trailer hitch part on the towing vehicle, and moving the towing vehicle toward the hitch-mating position in response thereto, until said beam of light projected directly upward is observed to strike a predetermined part of the inclined target member.

18. The method of claim 17 including the step of projecting a second beam of light rearwardly from the towing vehicle and at a predetermined acute angle with respect to a horizontal plane, observing, in said video image, a place where the second beam of light strikes the trailer and thereby estimating a distance between the towing vehicle and the trailer.

19. The method of claim 17 including the step of carrying said video camera on said trailer hitch part of the towing vehicle.

20. The method of claim 17 including the step of orienting the inclined target plate on the trailer tongue to face toward the towing vehicle before moving the towing vehicle closer than a predetermined distance from the tongue of the trailer.

21. The method of claim 17 including the step of placing the video camera in a predetermined orientation with respect to the towing vehicle before moving the towing vehicle closer to the trailer tongue than a predetermined distance.

22. The method of claim 17 including the steps of projecting a second beam of light rearwardly from the towing vehicle at an angle inclined at a predetermined angle upwardly above horizontal, and observing in the video image where the second beam of light impinges upon the trailer, as the towing vehicle approaches the trailer, and guiding the towing vehicle in response thereto.

* * * * *